(12) United States Patent  (10) Patent No.: US 7,610,212 B2
Klett et al.  (45) Date of Patent: Oct. 27, 2009

(54) SYSTEM AND METHOD FOR DETERMINING A DEMAND PROMISE DATE BASED ON A SUPPLY AVAILABLE DATE

(75) Inventors: Robert Duncan Klett, Ottawa (CA); James Robert Crozman, Kanata (CA); Vasile Gelu Ticala, Stittsville (CA)

(73) Assignee: Kinaxis Holdings Inc., Ottawa, Ontario ( * ) Notice: Subject to any disclaimer, the term of this patent is extended or adjusted under 35 U.S.C. 154(b) by 1233 days.

(21) Appl. No.: 10/438,932

(22) Filed: May 16, 2003

(65) Prior Publication Data

US 2003/0216952 A1  Nov. 20, 2003

Related U.S. Application Data

(60) Provisional application No. 60/381,063, filed on May 17, 2002, provisional application No. 60/395,335, filed on Jul. 12, 2002.

(51) Int. Cl.
*G05B 19/418* (2006.01)
(52) U.S. Cl. .......................................................... 705/8
(58) Field of Classification Search ...................... 705/8
See application file for complete search history.

(56) References Cited

U.S. PATENT DOCUMENTS 5,630,070 A * 5/1997 Dietrich et al. ................. 705/8
5,971,585 A * 10/1999 Dangat et al. ............... 700/102

(Continued)

FOREIGN PATENT DOCUMENTS

JP  2000322119  11/2000

(Continued)

OTHER PUBLICATIONS

McClelland, Marilyn K., Order Promising And The Master Production Schedule Decision Sciences, vol. 19. No. 4, Fall 1988, pp. 858-879.*

(Continued)

*Primary Examiner*—Scott L Jarrett
(74) *Attorney, Agent, or Firm*—Hoffman Warnick LLC (57) ABSTRACT

The present invention provides a method and a system for determining a promise date for a demand whose supply depends on constraints in a business environment. According to the present invention, information related to the business environment is stored within a data storage means. The present invention provides a processor coupled to the data storage means from which it requests and retrieves data. The processor also determines a plan date for each supply in the supply structure. The plan date is determined, from a highest level to a lowest level in the supply structure, based on existing and planned supply in the supply structure. After determining a plan date, the processor determines an available date for each supply in the supply structure. The available date is determined, from the lowest level to the highest level in the supply structure, based on the availability of each supply in the supply structure, and the plan date determined for each supply. Finally, the processor generates a promise date for the demand for the item based on each available date determined for a corresponding supply in the supply structure. The present invention advantageously generates promise dates based on information available in real-time on both the supply structure and the capacity constraints for a given item.

25 Claims, 9 Drawing Sheets

U.S. PATENT DOCUMENTS

| | | | | |
|---|---|---|---|---|
| 5,974,395 | A | * | 10/1999 | Bellini et al. .................. 705/9 |
| 5,983,194 | A | * | 11/1999 | Hogge et al. .................. 705/7 |
| 6,167,380 | A | | 12/2000 | Kennedy et al. |
| 6,188,989 | B1 | | 2/2001 | Kennedy |
| 6,321,133 | B1 | * | 11/2001 | Smirnov et al. ............. 700/100 |
| 6,415,196 | B1 | * | 7/2002 | Crampton et al. ........... 700/100 |
| 6,463,345 | B1 | * | 10/2002 | Peachey-Kountz et al. .... 700/99 |
| 6,477,660 | B1 | | 11/2002 | Sohner |
| 6,701,201 | B2 | * | 3/2004 | Hegde et al. ................ 700/107 |
| 6,801,820 | B1 | * | 10/2004 | Lilly et al. .................. 700/100 |
| 6,898,472 | B2 | * | 5/2005 | Crampton et al. ............. 700/97 |
| 6,920,427 | B2 | * | 7/2005 | Anthony et al. ................ 705/8 |
| 6,963,847 | B1 | * | 11/2005 | Kennedy et al. ............... 705/8 |
| 7,058,587 | B1 | * | 6/2006 | Horne .......................... 705/7 |
| 7,065,499 | B1 | * | 6/2006 | Seth et al. .................... 705/26 |
| 7,188,075 | B1 | * | 3/2007 | Smirnov ..................... 705/10 |
| 7,249,044 | B2 | * | 7/2007 | Kumar et al. .................. 705/8 |
| 7,295,990 | B1 | * | 11/2007 | Braumoeller et al. .......... 705/7 |
| 7,346,530 | B2 | * | 3/2008 | Jones et al. ..................... 705/8 |
| 2002/0042755 | A1 | | 4/2002 | Kumar et al. |
| 2002/0042756 | A1 | | 4/2002 | Kumar et al. |
| 2002/0095307 | A1 | * | 7/2002 | Greamo et al. ................. 705/1 |
| 2002/0138358 | A1 | * | 9/2002 | Scheer ........................ 705/26 |
| 2002/0188499 | A1 | * | 12/2002 | Jenkins et al. ................ 705/10 |
| 2003/0033180 | A1 | | 2/2003 | Shekar et al. |
| 2003/0074349 | A1 | * | 4/2003 | Gupta et al. .................... 707/3 |
| 2003/0144896 | A1 | * | 7/2003 | Ko et al. ...................... 705/10 |
| 2003/0171962 | A1 | * | 9/2003 | Hirth et al. ..................... 705/7 |

FOREIGN PATENT DOCUMENTS

| | | |
|---|---|---|
| JP | 2001100829 | 4/2001 |

OTHER PUBLICATIONS i2 Technologies Unveils Rhytm Customer Commitment Suite PR Newswire, Jul. 21, 1998.* e-SupplierLink Launched for Global e-Supply Chain Planning Networks PR Newswire, Mar. 10, 2000.* webPLAN and Pivotal Make Integrated Demand Chain and Supply Chain a Reality Business Wire, Aug. 30, 2000.*

Logility Announces Latest Release of Supply Planning For Profit Maximization and Cost Minimization PR Newswire, Oct. 23, 2000.*

Banker, Steve, Promises Multichannel Merchant, Apr. 1, 2000.*

Klett, Duncan, Sell It, Then Build It—How Electronics Manufacturers Are Using Collaborative Trading Networks for Compettitive Advantage, Ascet, vol. 3, Apr. 15, 2001.*

Chen, Chien-Yu et al., Quantity and Due Date Quoting Available to Promise Information System Frontiers, vol. 3, No. 4, Dec. 2001.* webPLAN Boots eSupply CHain Solutions Manufacturing Automation, vol. 11, No. 4, Jun. 2002.* van Eck, Marjolein, Advanced Planning and Scheduling BWI Paper, Apr. 2003.*

Taylor, Sam G. et al., Finite Capacity Promising Production and Inventory Management Journal; vol. 40 No. 3, 1999, pp. 50-56.*

Greene, Alice, Making better promises MSI< vol. 19, No. 4, Apr. 2001, p. 22.*

Orlicky, Materials Requirements Planning: The New Way of Life in Production and Inventory Management, Chapter 4, 1974, pp. 67-97, The McGraw-Hill Companies, New York.

webplan Corp., webplan CeO, Version 6.0 Merges Planning and Execution for Alignment of Supply and Demand in Collaborative Trading Networks, Nov. 27, 2001, 2 pages.

webplan Corp., webplan 7.0 Extends Award-Winning Supply Chain Technology to the Mid-Tier, Jun. 13, 2002, 3 pages.

European Patent Application No. 03 724 722, Office Action, Jan. 22, 2009, pp. 1-4.

Webplan 7.0 Extends Award-Winning Supply Chain Technology to the Mid-Tier, Kinaxis News Release, Jun. 13, 2002, 2 pages.

* cited by examiner

SYSTEM AND METHOD FOR DETERMINING A DEMAND PROMISE DATE BASED ON A SUPPLY AVAILABLE DATE

RELATED APPLICATIONS

This application claims the priority of U.S. Provisional Patent Applications Ser. No. 60/381,063 filed 17 May 2002 and 60/395,335 filed 12 Jul. 2002.

FIELD OF THE INVENTION

The present invention relates to the field of committing to the completion of an activity or delivery of a demand in a business environment by providing a promised completion, or delivery date, for an item in a business environment.

BACKGROUND TO THE INVENTION

In the field of Supply Chain Management, traditional systems have relied upon stored data to define the availability of either the item to be ordered or of the immediate items that make up the item to be ordered. The stored data that defines the availability of items has been either an accounting of available inventory, or a combination of accounted-for inventory and tracked replenishments on order. Furthermore, previous systems have relied upon other systems to periodically update the item availability information. Such an approach, utilized by previous systems, presents several problems. For example, some systems only operate for orders of items that are expected to be ordered and treat the availability of all resources in the same manner, i.e. the availability of materials treated in the same manner as the availability of capacity. However, the various types of resources are quite different with respect to their availability, either temporarily or permanently. While materials, unused in a given period, are generally available in any subsequent period, unused capacity in a given period is usually not available in any subsequent period. For these systems to determine the availability of items for a new request, availability information for supplies of that item and its immediate components, if any, must be available, together with availability information for the capacity constraints. Provided that both current and relevant information is available, the system is able to make a determination with respect to the availability of the item. Otherwise, such systems are flawed, as they are reliant on regular updates of item availability information.

Other supply chain management systems determine item availability by developing a detailed production schedule for the needed items, while respecting existing commitments for supplying items. These systems, commonly known in the art as finite capacity schedulers, require excessive computing resources and time to generate a new schedule for each changed supply or demand. The excessive computation times are problematic in business environments where businesses are required to provide completion or delivery dates in a timely manner for interactive purposes.

More recent prior art has addressed the processing time inherent in updating plans. They use two processes. The first process generates an entire plan from the initial data. The second process accepts a small number of changes and replans or repairs the plan around those data changes. The intention being that the processing time to repair a plan after accepting a limited number of changes is much less than the processing time required to generate a new plan from the entire data set.

The present invention (1) reduces the complexity of the calculations and (2) manages storage of intermediate results so that new plans can be generated whenever data changes.

Supply Chain Management concepts underlie many types of business environments, such as manufacturing environments, distribution environments and business organization environments. Each business environment generally has a supply structure producing various items. The prior art systems utilize the supply structure to map out a completion or delivery date for demand and supplies in these business environments. In a manufacturing environment an item is produced, for example, by applying processes to components. The components themselves may also be made from processes and subcomponents, resulting in several layers of process and components needed to make the item. These layers of processes, components and subcomponents form the supply structure for the item. These systems use the principles of netting and explosion to determine a completion or delivery date for the demand. These principles are further elaborated upon in "Material Requirements Planning: The New Way of Life in Production and Inventory Management", by Joseph A. Orlicky, N.Y.: The McGraw-Hill Companies, 1974.

In the prior art, however, current supply chain management does not incorporate capacity constraints when determining completion or delivery dates for requested demands. What is needed therefore is a method of determining promise dates for an item having at least one capacity constraint where the availability of supplies for a given item are not known in advance. What are further needed are a method and a system where the promised delivery date of a demand is determined in an expedited manner without adversely affecting the promise dates of existing commitments for items.

SUMMARY OF THE INVENTION

The present invention provides a method and a system for determining a promise date for a demand whose supply depends on constraints, in a manufacturing, distribution, supply chain, or other business environment. According to the present invention, information related to the manufacturing, the distribution, the supply chain structure, or the business environment is stored within a data storage means. The present invention provides a processor coupled to the data storage means from which it requests and retrieves data. The processor also determines a plan date for each supply in the supply structure. The plan date is determined, from a highest level to a lowest level in the supply structure, based on existing and planned supplies in the supply structure. The plan date may also be determined based on an availability of one or more capacity constraints for each supply. After determining a plan date, the processor determines an available date for each supply in the supply structure. The available date is determined, from the lowest level to the highest level in the supply structure, based on the availability of each supply in the supply structure, and the plan date determined for each supply. The available date may also be determined based on the availability of one or more capacity constraints required fulfilling each supply. Finally, the processor generates a promise date for the demand for the item based on each available date determined for a corresponding supply in the supply structure.

The present invention is advantageous in that it generates promise dates based on information available in real-time on both the supply structure and the capacity constraints for a given item. Another advantage of the present invention is that it utilizes a prioritizing system to protect promise dates committed for demands of a higher priority. Previous commitments of supplies are only broken if essential to meet the requirements of a higher priority demand.

In a first aspect, the present invention provides a method of determining a promise date for a demand in a business environment based on a demand produced for the item and a supply structure for fulfilling the demand, the method comprising the steps of:

(a) for each supply in the supply structure, determining a plan date, based on existing and planned supplies in the supply structure, from a highest level to a lowest level in the supply structure;

(b) for each supply in the supply structure, determining an available date, based on: i) the availability of each supply in the supply structure, and ii) the plan date determined in step (a), from the lowest level to the highest level in the supply structure; and (c) generating the promise date for the demand based on the available date determined in step (b).

In a second aspect, the present invention provides a system for determining a promise date for a demand in a business environment based on a demand produced for the item and a supply structure for fulfilling the demand, the system comprising: a data storage means for storing data information related to the business environment; and a processing means for generating a promise date for the demand for the item, the processing means being coupled to the data storage means; wherein the processing means requests and retrieves data information related to the business environment from the data storage means, and wherein the processing means determines a plan date for each supply in the supply structure based on existing and planned supplies in the supply structure, from a highest level to a lowest level in the supply structure; determines an available date for each supply in the supply structure based on i) the availability of each supply in the supply structure, and ii) the plan date determined for each supply, from the lowest-level to the highest-level in the supply structure; and generates the promise date for the demand for the item based on the available date determined for each supply in the supply structure.

In a third aspect, the present invention provides a computer-readable medium having stored thereon, computer-readable and computer-executable instructions which, when executed by a processor, cause the processor to perform the steps of:

(a) for each supply in the supply structure, determining a plan date, based on existing and planned supplies in the supply structure, from a highest level to a lowest level in the supply structure;

(b) for each supply in the supply structure, determining an available date, based on: i) the availability of each supply in the supply structure, and ii) the plan date determined in step (a), from the lowest level to the highest level in the supply structure; and (c) generating the promise date for the demand based on the available date determined in step (b).

BRIEF DESCRIPTION OF THE DRAWINGS

The present invention will now be described in reference to the drawings, in which.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

For the purposes of this document, a promise date is defined as either a completion date or a delivery date for a particular supply or demand. As well, a plan date is defined as the due date of a supply. The definition of a supply for an item may be expanded to include subassemblies or components within a supply structure. Thus, the application of the present invention is not limited to fulfilling a demand for the highest level item in a supply structure. It should further be mentioned that a supply structure may be dependent on one or more constraints. Constraints may be defined in terms of a capacity or a material required to fulfill a demand in a supply structure.

Figure 1:
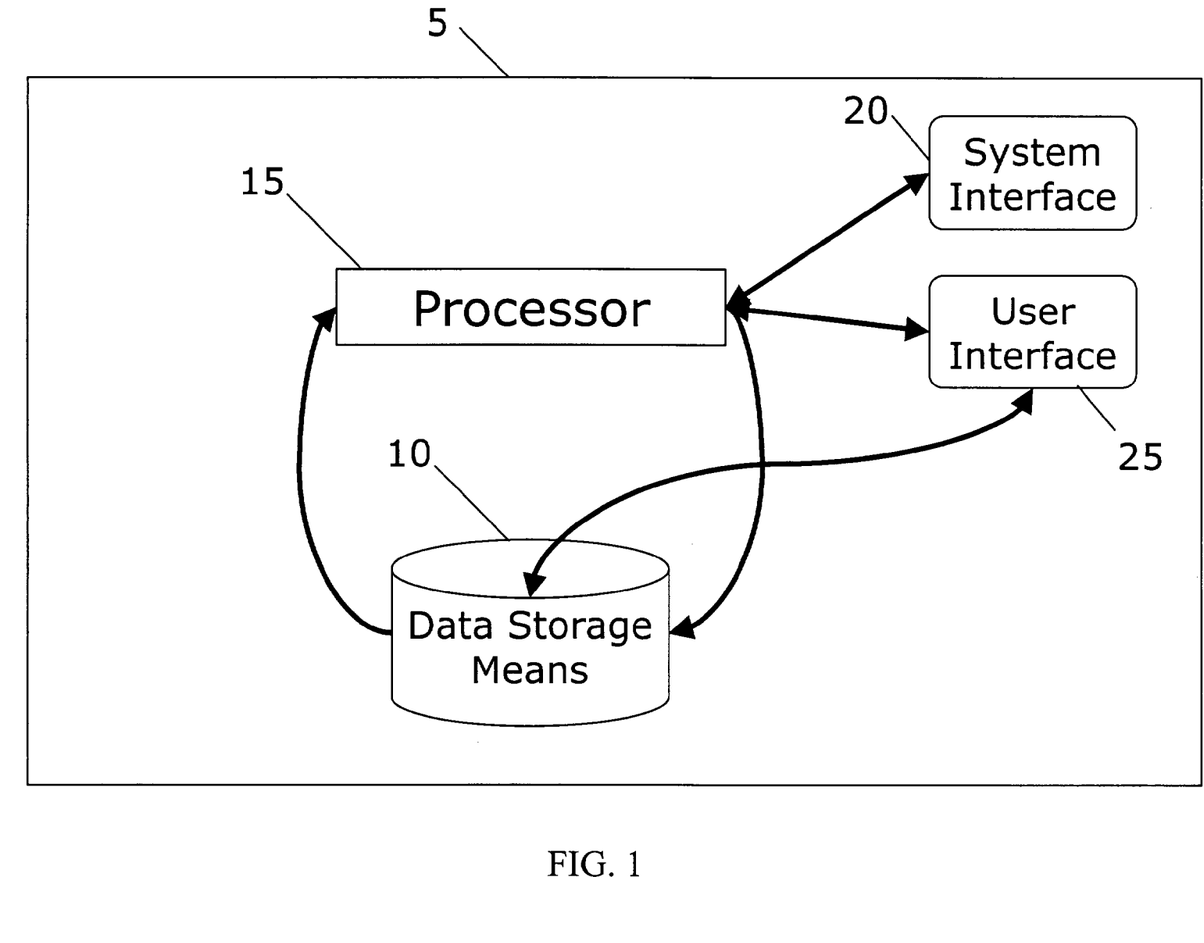
FIG. 1 is a block diagram of the planning and execution system according to the present invention.
Figure 3:
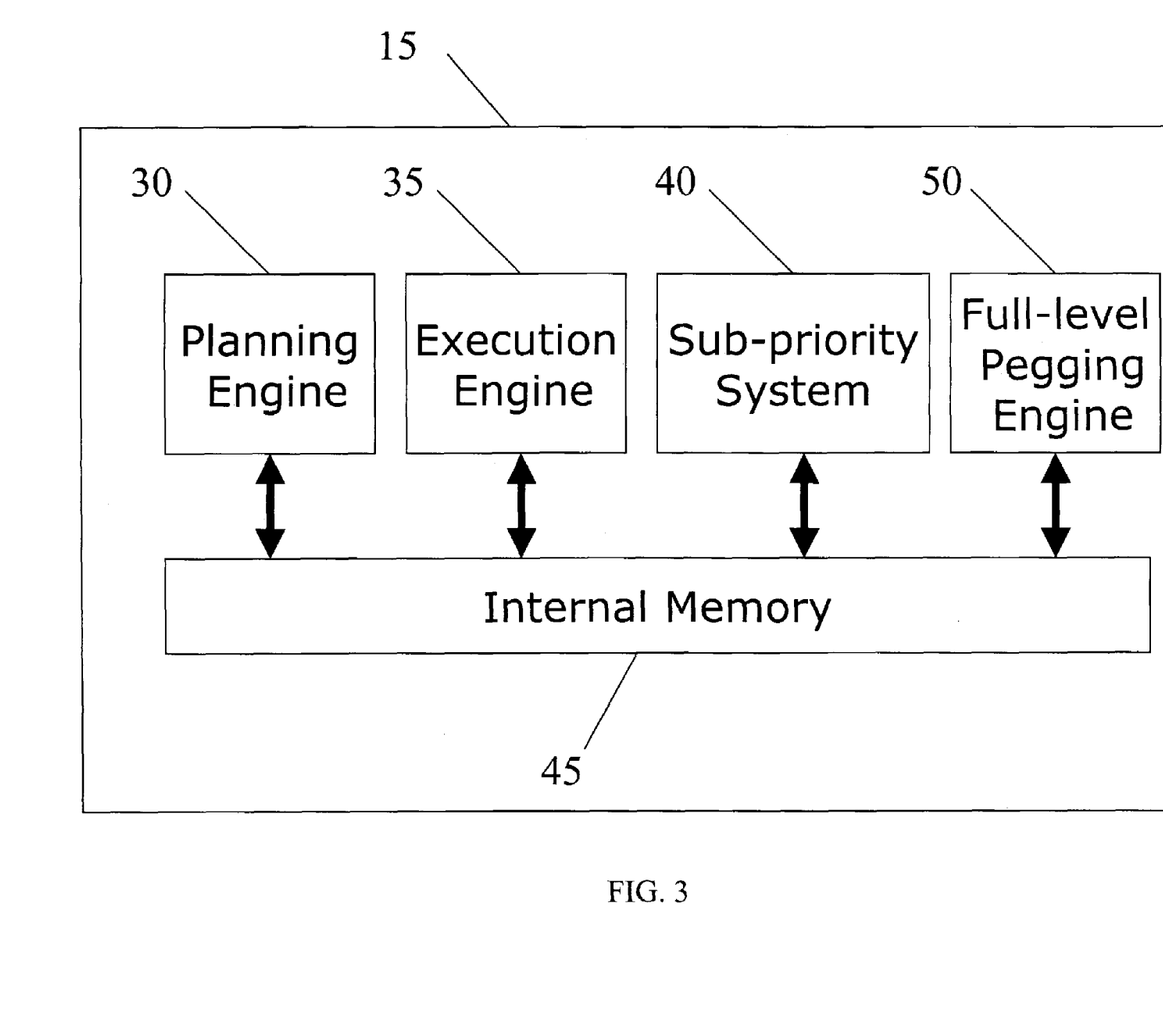
FIG. 3 is a block diagram of the processor in FIG. 1 according to the present invention.

FIG. 1 is a block diagram of a system 5 that generates promise dates for demands in a business environment where the item has a supply structure for fulfilling a demand for the item. The system 5 includes a data storage means 10 for storing data relevant to manufacturing, distribution, and supply chain operations such as, but not limited to, current inventories, product structure, supply chain relationships (supplier/consumer locations and relationships), customer demands, purchased supplies, production supplies, item sourcing, ordering policies, and lead times. Connected to the data storage means 10 is a processor 15 for determining plan dates and available dates in order to generate a promise date for a requested item. In many cases, certain data related to the capacity constraint rates and the supply sources for a requested item may be stored in an internal memory, as shown in FIG. 3, within the processor 15 rather than within the data storage means 10.

The processor 15 of the present invention may also be coupled to a user interface 25 and or a subsidiary system interface 20 as shown in FIG. 1. For example, in a supply chain environment the present invention may be embodied on a server and connected to other systems via a network. The subsidiary system interface 20 would enable another system to connect with the system processor 15.

Figure 2:
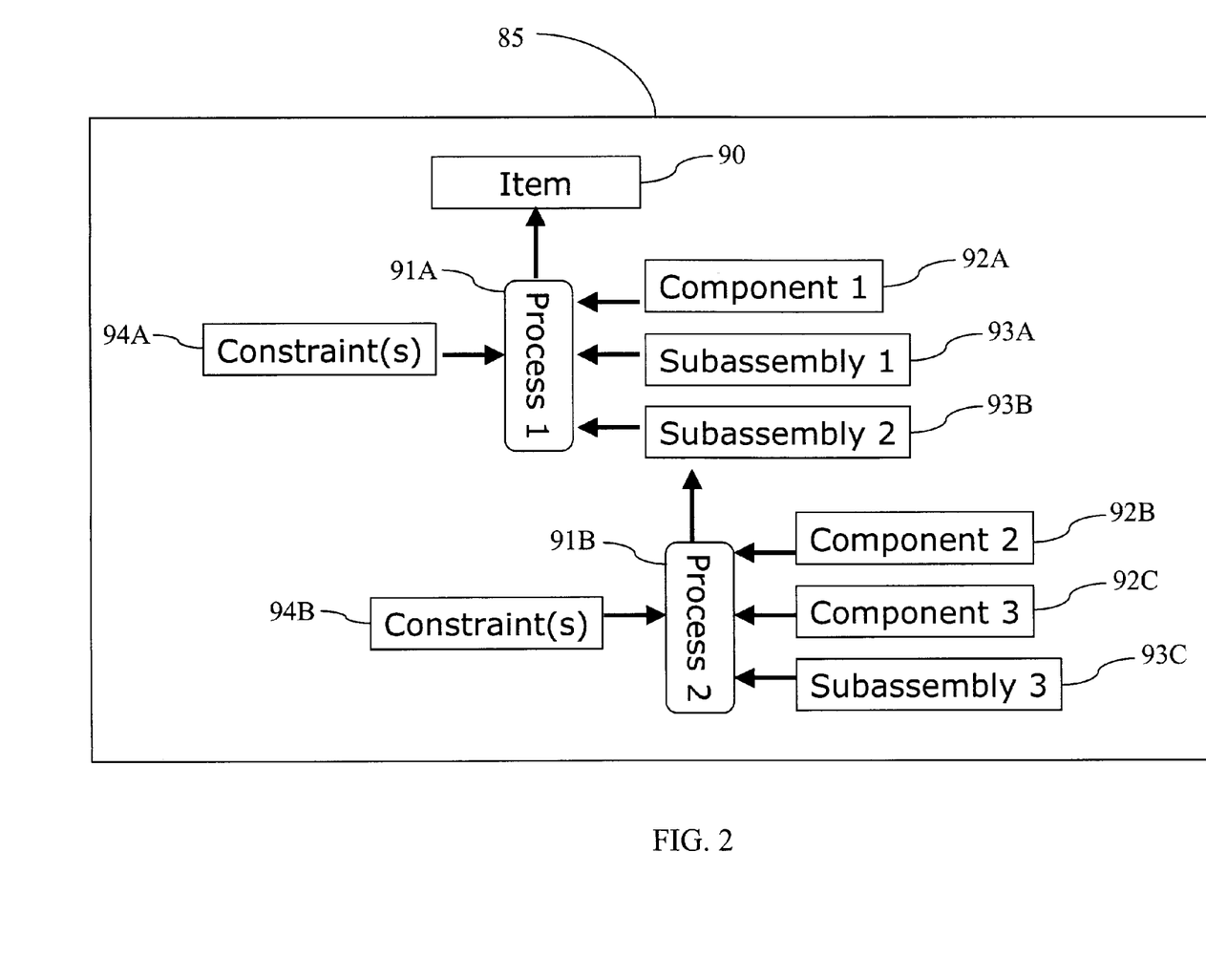
FIG. 2 is a block diagram of an exemplary supply structure used by the present invention.

An example of a business environment with a supply structure 85 for an item 90, for use with the present invention, is shown in FIG. 2. In FIG. 2, the supply structure 85 contains processes 91A, 91B, components 92A, 92B, 92C, subassemblies 93A, 93B, 93C, and capacity constraints 94A, 94B, for making the item 90. These processes 91A, 91B are applied to components 92A, 92B, 92C and to subassemblies 93A, 93B and 93C. In many cases, subassemblies 93A, 93B, 93C are themselves made from other subassemblies and components (only the supply structure for subassembly 93B is shown).

It is understood that the present invention may provide promise dates for a variety of supply structures, such as, but not limited to, a project task structure, a business organizational structure, and a supply chain structure.

FIG. 3 is a block diagram of the processor 15 as shown in FIG. 1. The processor 15 contains three sub-processing units, a planning engine 30, an execution engine 35, and a sub-priority system 40, and an internal memory 45. The processor may also contain a fourth sub-processing unit, known as a full-level pegging engine 50. The planning engine 30 determines plan dates for each supply in the supply structure based on the availability of capacity constraints and existing and planned supplies required to fulfill a demand for a given item. The execution engine 35 determines available dates for each supply in the supply structure based on the availability of supplies, the availability of capacity constraints and the plan date of the supplies determined by the planning engine 30. Finally, the execution engine 35 generates a promise date for the demand based on the determined available dates.

In FIG. 3, the sub-priority system 40 tracks the sequence in which demand commitments are made. Every independent supply and demand associated with an item has a unique sub-priority value assigned to it. The sub-priority value is normally defined by the sequence in which the independent supply or demand for the item was requested. The processor 15 queues every supply and demand through both planning engine 30 and the execution engine 35 based on the assigned sub-priority values.

In a preferred implementation of the sub-priority system 40, the processor 15 maintains a data register of the next sub-priority value assignable to a supply and demand for an item. Whenever a new supply or demand order for an item is entered into the system, or whenever the priority of a supply or demand is changed, the next sub-priority value is assigned to the supply or demand and the register value is incremented to a next sub-priority value. If a supply or demand is created and its priority changes, that system generated sub-priority value may be overridden, thus allowing a system user to manage the assigning of sub-priority values directly. Situations where such an option are implemented are for example in: 1) applications determining an available date for a supply at a different priority, then deciding to revert to the original priority, and finally retaining the original sub-priority; and 2) applications determining a preferred supply sequence, such as a separate optimization algorithm, where a sub-priority value is assignable to supplies and demands in a preferred sequence.

Figure 4:
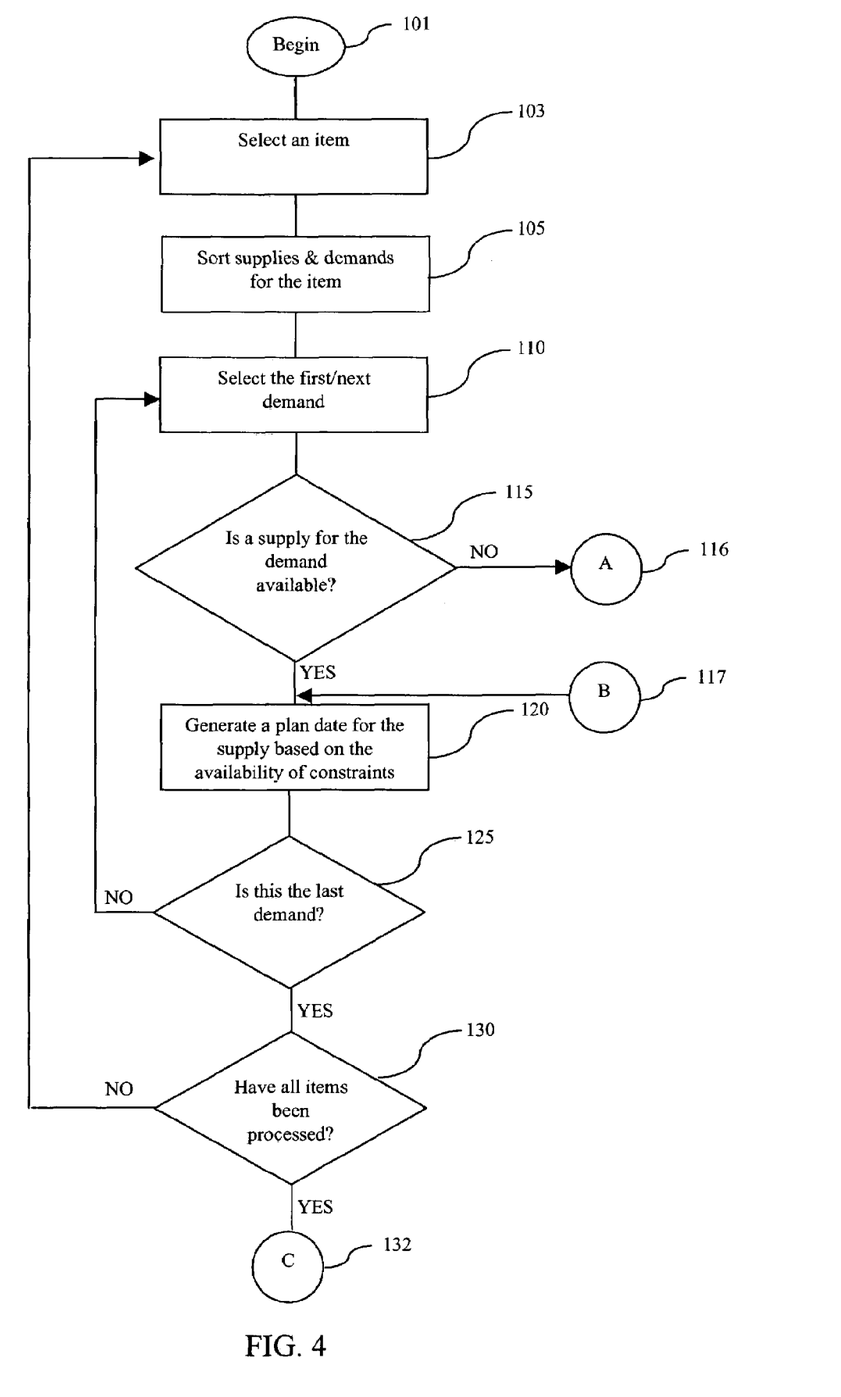
FIG. 4 is a flowchart of a process for determining a plan date for each of the supplies in the supply structure according to the present invention.
Figure 5:
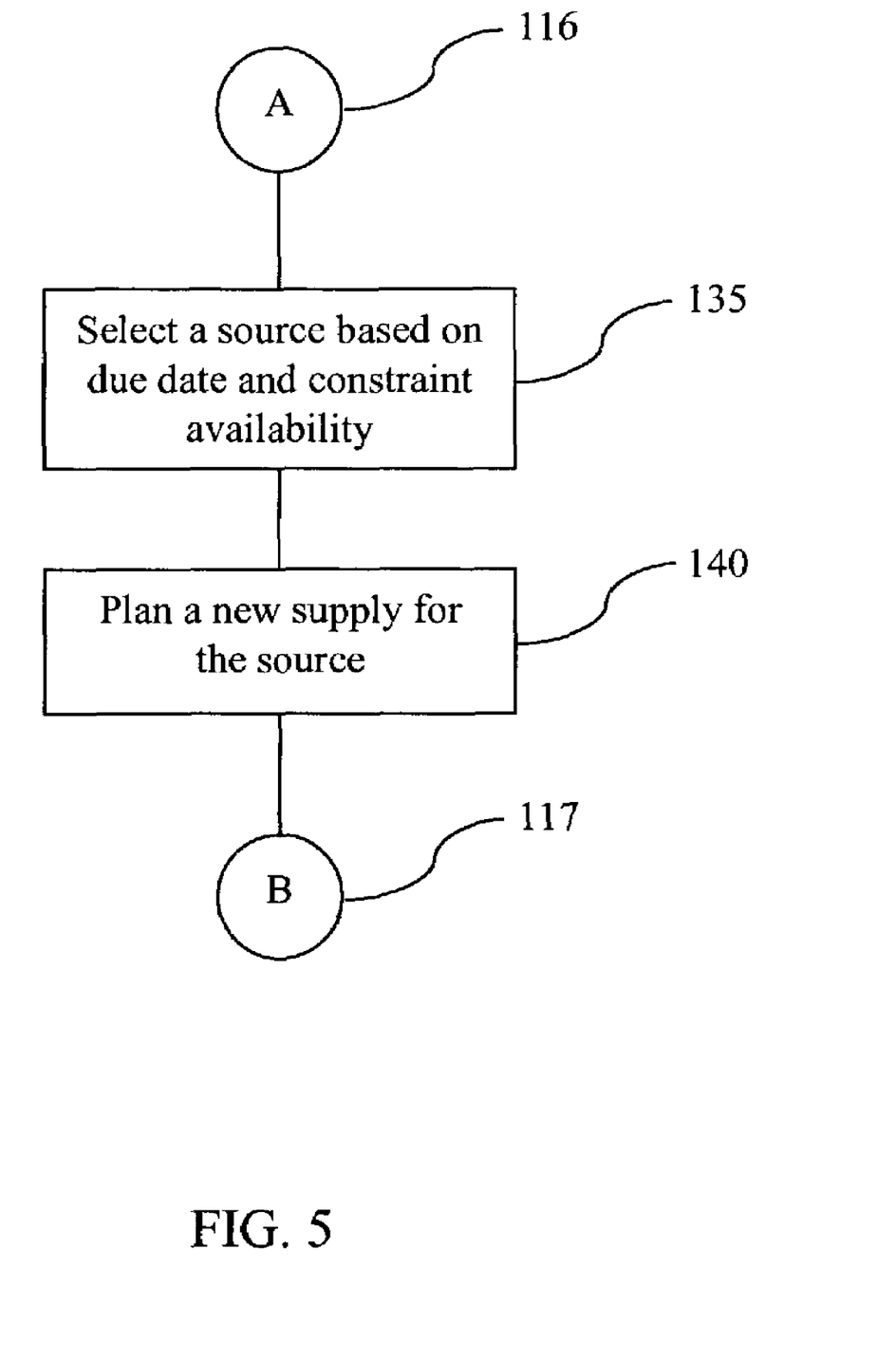
FIG. 5 is a flowchart of a subsidiary process of FIG. 4 for planning a new supply for an unfulfilled demand.

Referring now to FIG. 4, a flowchart is shown that details a process implemented by the planning engine 30 as in FIG. 3, to determine plan dates for each supply in the supply structure. The process of the planning engine begins at step 101. In the next step 103, an item to be processed is selected. The process proceeds to step 105 where it sorts a list of demands that includes demands for all the items that have any source that uses a common capacity constraint. Furthermore, in step 105 a list of existing supplies, required to produce the item, is sorted. The process then proceeds to step 110 where it selects the first demand in the sorted demand list. In step 115, the process determines if a supply that fulfills the first demand exists. If an existing supply that fulfills the first demand is unavailable, the process then uses connector A 116 to proceed to a subsidiary process for planning new supply, shown in FIG. 5. Once the subsidiary process of FIG. 5 is complete, the process follows connector B 117 to return to step 120. If a supply exists to satisfy the demand in step 115, then in step 120 a plan date is generated based on the availability of capacity constraints. In a next step 125, the process determines if this is the last demand in the demand list for the item. If this is not the last demand, the process returns to step 110. Otherwise, the process continues in step 130 and determines if all the items have been processed. If all items have not been processed, the process returns to step 103 and selects another item. If all items have been processed then the process continues with connector C 132 to a subsequent process for determining available dates shown in FIG. 7.

To further elaborate on the process in FIG. 4, once it is determined that a supply exists to fulfill the demand in step 115, the supply is allocated to the demand. This allocation is achieved using a running balance array to track the projected running balance of the inventory for that item. The supplies of the item are allocated to demand in the period in which they are available. The running balance row is initialized with the current on-hand inventory entered into a balance entry of the array. The process then determines if the supply can fulfill the demand by removing the current demand from the running balance array for the item. If the balance remains positive for all time periods, a plan date is generated according to step 120 in FIG. 4, and the next demand in the demand list is processed according to step 110. When the balance in an array period becomes less than zero, the process finds a supply to satisfy that negative balance in the first time period in which the balance becomes negative. If no existing supply can be used to satisfy this negative balance, then a new supply is planned by following connector A 116 to the subsidiary process in FIG. 5. There is no supply available if the negative balance is before the earliest plan date of all supplies for the item or after the date used of all supplies for that item.

FIG. 5 is a flowchart detailing a subsidiary process for planning new supply when insufficient supply for fulfilling the demand in step 115 is available. The subsidiary process begins from connector A 116. In the first step 135, a source for the supply is selected based on the due date of the demand and the availability of capacity constraints required to produce the supply. In the next step 140, the process plans a new supply for the source that fulfills the demand that was previously unavailable. The process follows connector B 117 and returns to step 120 in FIG. 4.

To further elaborate step on 135, a source for supply is selected based on the plan date of the supply and the availability of capacity constraints needed to satisfy the supply. Rules such as source priority, proportional allocation amongst various sources, round-robin allocation, capacity constraint availability, that are known by the skilled artisan, are used to determine the source(s) that is used to satisfy the demand.

As is generally understood by the skilled artisan, and as is further elaborated upon in, "Material Requirements Planning: The New Way of Life in Production and Inventory Management", by Joseph A. Orlicky, New York: The McGraw-Hill Companies, 1974, the lot sizing rule by definition requires a minimum lot size and multiple quantities of the lot size to determine the quantity of a supply to plan.

To further elaborate on step 140 in FIG. 5, the process selects the highest priority source(s) for that item that is active for the date of the negative balance and has capacity constraint available in that period to satisfy at least the minimum order quantity. If no source satisfies these conditions, the sources for earlier dates are tested, up to the earliest planning date of all sources. Allocation rules have been defined to allocate new supply to one or more of the usable sources. For each allocated source, a planned supply for the demand is created. The quantity of each planned supply is determined as the lesser of the lot sized quantity less than or equal to the amount of capacity constraint that remains unused, and the quantity found by applying lot sizing rules to the negative balance quantity. The plan date is the date for which the source availability is being tested. The priority and sub-priority for the planned supply are copied from the priority and sub-priority of the current demand. Add the quantity of the planned supply to its plan date period and to all subsequent periods in the balance array. If a negative balance persists, the process returns to step 135 in FIG. 5 and continues planning new supply until the balance in the period is no longer negative.

If all sources have been exhausted for the negative balance date and all previous periods, the demand cannot be satisfied on time. The current negative balance is set to zero, and the process tests the next period. If its balance is greater than or equal to zero for a given period, then unused supply must exist in that period and no new supply needs to be planned for the period. The process continues checking the balance array for subsequent periods. If the balance is negative, the process repeats the previous steps, starting from seeking new supply for that period. The previous periods are not checked for capacity constraint availability.

If insufficient supply can be planned for the period, continue with the process from setting the current negative balance to zero. Finally, if negative balances persist and no more supply can be planned in any period, add the amount of the negative balance to the current and all subsequent periods in the array. The process continues to process the remaining demands in the list, i.e. demands for different items continue to be processed.

If a supply exists on the list of supplies for the item that has an earliest plan date on or before the date of the first negative balance and whose date used is after the date of the negative balance, then the first such supply is rescheduled to the current balance array period. Rescheduling consists of:

(1) setting a plan date used to the current array date,
(2) adding the supply's quantity to the current array balance and to each array balance between the current array date and the supply's current date used
(3) if the supply has any capacity constraints allocated to it, relinquishing the capacity constraint it had used at its date used and re-allocating capacity constraint at the current array balance date
(4) recalculating the supply's start date.

Once the supply has been rescheduled, the process again checks for negative array balances, starting with the current period. If a negative balance is found, then the process of FIG. 4 continues to seek a supply to satisfy the negative balance.

The decision at step 125 in FIG. 4, causes all demands to be processed from the highest level to the lowest level in the supply structure.

Figure 6:
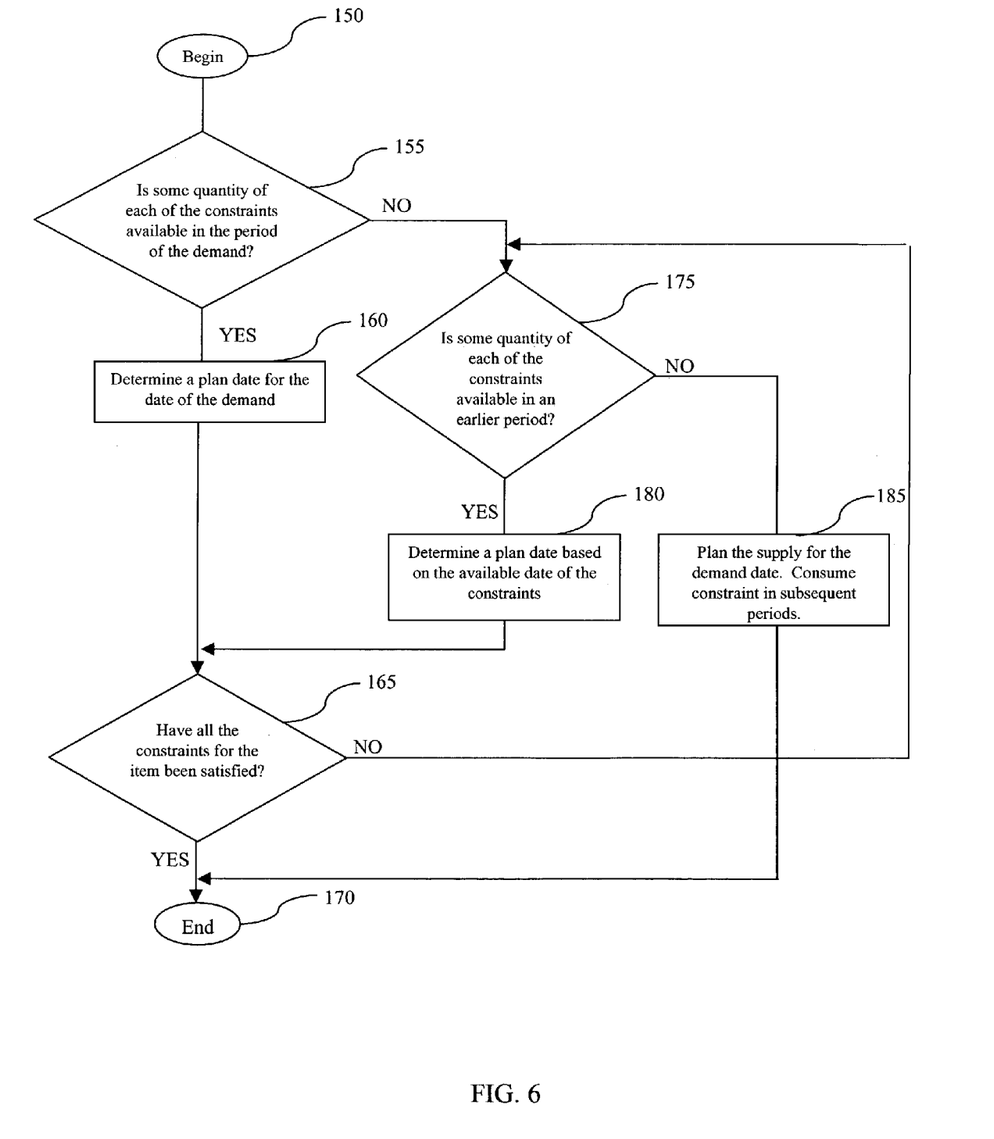
FIG. 6 is a flowchart of a subsidiary process of FIG. 4 for determining a plan date for supplies that depend on capacity constraints.

FIG. 6 is a flowchart of a subsidiary process of step 140, of FIG. 5, which determines a plan date for a supply that depends on capacity constraints. The process begins at step 150. In a first step 155, the process determines whether some quantity of each of the capacity constraints is available in the period required by the demand. If some quantity of each of the capacity constraints is available in the period of the demand, the process proceeds to step 160. According to step 160, the process determines a plan date for the date of the demand. The process then proceeds to decision step 165, where it determines if all the capacity constraints for the supply have been satisfied. If all the capacity constraints for the supply have been satisfied in step 165, the process ends with step 170. Otherwise, according to step 155, if some quantity of at least one of the capacity constraints is not available in the period of the demand the process proceeds to step 175. Also, if all the capacity constraints for the supply have not been satisfied in decision step 165, the process proceeds to step 175. According to step 175, the process determines if some quantity of each of the capacity constraints is available in an earlier period. If some quantity of each of the capacity constraints is available in an earlier period, the process proceeds to step 180. According to step 180, the process determines a plan date based on the available date of the capacity constraints. The process then returns to decision step 165. Otherwise, in step 175, if some quantity of at least one of the capacity constraints is not available in an earlier period, the process proceeds to step 185. In step 185, the process plans the supply such that it will meet the plan date and allocates the capacity constraint required to fulfill the supply in subsequent time periods. The process then returns to step 170, where the process is finally ended.

It should be further mentioned that in steps 120, 135, 155 and 175 in FIGS. 4, 5 and 6, where a source has one or more active capacity constraints, the planning engine 30 tracks the amount of each capacity constraint that is used by each supply. This tracking function is accomplished using a data array of unused capacity constraints for each active capacity constraint. The array is initialized with the amount of the capacity constraint that is available in each capacity constraint period. The cumulative maximum value for the capacity constraint is also tracked and stored in the array.

When allocating a capacity constraint to a supply order and determining the start date of an existing supply order, the capacity constraint is allocated first from the cumulative maximum value. If it has sufficient quantity available, then the capacity constraint is allocated from the data array. If insufficient capacity constraint is available in the cumulative maximum value for the capacity constraint, then the capacity constraint allocation for the supply is stopped and the supply is processed according to the capacity constraint that has been allocated to it. Provided sufficient cumulative maximum value for the capacity constraints remains, then the capacity constraint is allocated for the supply plan date, and then the unused capacity constraint from earlier periods is used. If there is not enough unused capacity constraint available in earlier periods, the capacity constraint is allocated from subsequent periods. The supply start date—where processing begins for the given supply—is then calculated by applying a lead-time to the earlier of the supply plan date or the date of the earliest capacity constraint allocated to the given supply. Several relationships between the period for which capacity constraint is allocated and the supply plan date are possible, including allocating a capacity constraint on the plan date itself, or allocating a capacity constraint on the plan date adjusted by either the shipping time or the normal production lead time.

For new planned supply, it is understood that a supply is planned for each period in which capacity constraint is allocated. The plan date for a planned supply is always on or before its demand date, even if the capacity constraint allocated to it is after that date. If a source is limited by more than one active capacity constraint, there must be enough unused capacity constraint for each of the capacity constraints in a period for the lesser of one minimum order quantity and the remaining quantity of the supply that has not had capacity constraint allocated to it. If that minimum amount of each capacity constraint is not available in a period, then none of the unused capacity constraint in that period will be used for that supply.

Figure 7:
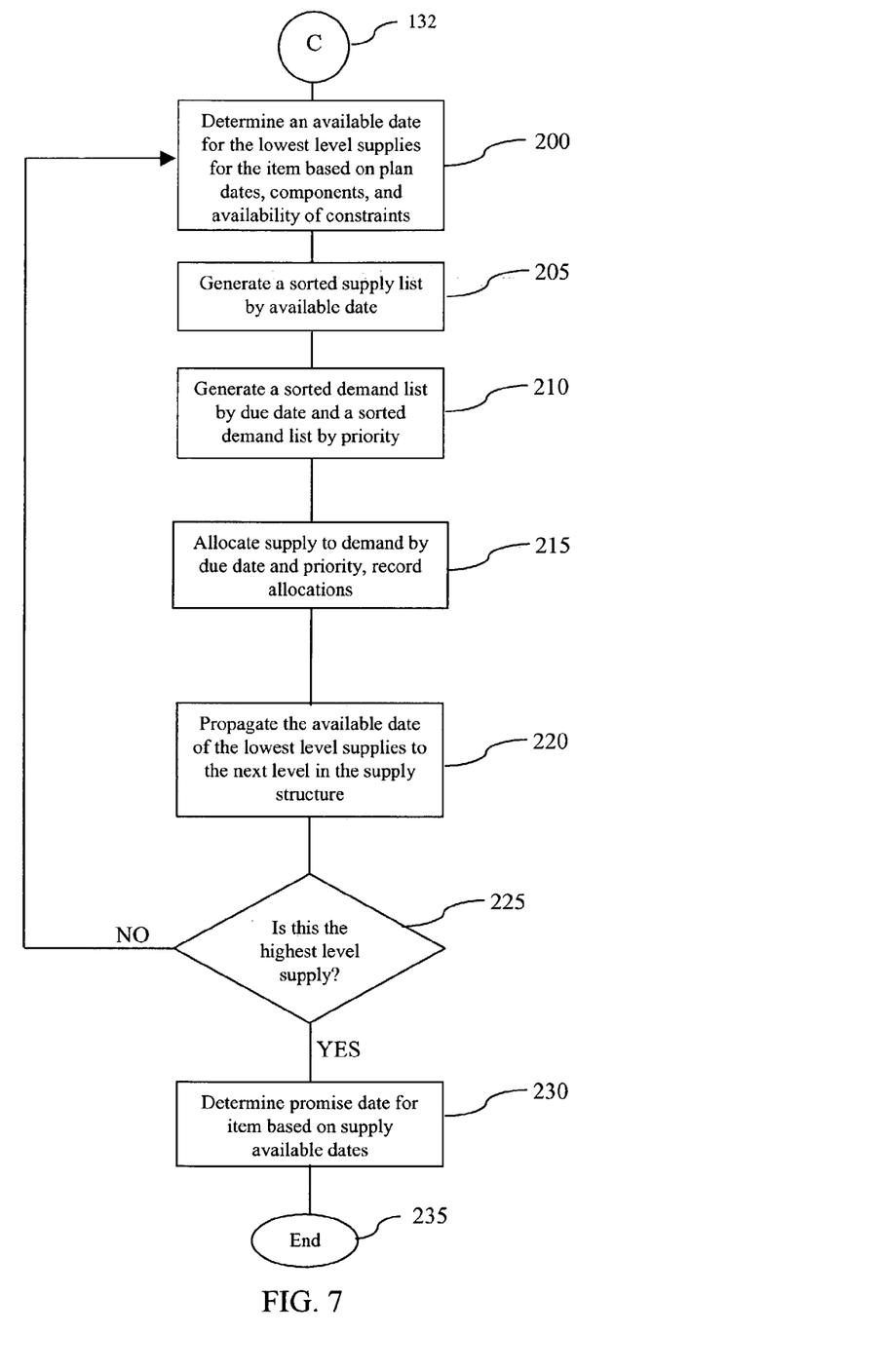
FIG. 7 is a flowchart of a process for determining an available date for each of the supplies in the supply structure according to the present invention.

Referring now to FIG. 7, the flowchart details a process of the execution engine 35, as shown in FIG. 3, for determining an available date for each supply in a supply structure. The process begins from connector C 132. In a first step 200, the process determines an available date for the lowest level supplies for the item. The available date of lowest level supplies is determined by their plan date, order status, source lead time, and capacity constraint requirements according to the following rules:

a) for a supply with no capacity constraints, the available date is the later of the run date plus lead time and plan date for a supply that has not been started, or the later of the run date and plan date for a supply that has been started;

b) for a supply with one or more capacity constraints, the available date is found by starting to seek capacity constraint in the period determined by the initial available date in the paragraph above. The available date is based on the date of the last capacity constraint that is allocated to the supply to satisfy all its capacity constraint requirements. The available date is also adjusted for shipping time and/or the normal production lead-time.

In FIG. 7, the execution engine then proceeds to step 205, where it generates a sorted list for all the supplies for each item. The supply list is sorted by available date, priority, sub-priority and plan date. According to step 210, two demand lists are created. The first demand list is sorted by plan date, priority and sub-priority. The second demand list is sorted by priority, sub-priority and plan date. The execution engine in step 215 then allocates supply to demand. In a preferred embodiment of the invention, supplies are allocated so that all demands are satisfied for their plan dates. When an on-time allocation cannot be achieved, the supplies are allocated so that the demands with higher priority and sub-priority are satisfied on time while those of a lower priority and sub-priority are satisfied later than their plan dates.

The allocation of supply to demand in step 215 proceeds by tracking the unallocated portion of each supply and demand. For each allocation, a supply-to-demand allocation record is created in the internal memory 45 shown in FIG. 3. The supply-to-demand allocation record consists of a supply reference value, a demand reference value, a date the supply is allocated, and a quantity of supply and demand that is allocated. Reference values are also provided when demand does not exist, representing extra supply, or when supply does not exist, to represent unsatisfied demand.

There are two variants of the supply-to-demand allocation process of step 215, allocating excess supply by earliest possible date or allocating excess supply by latest possible date. Allocating excess supply by earliest date preserves the ability to use the excess supply to satisfy demands that have not yet been received. Allocating excess supply by latest date provides available dates that are at the earliest possible date for each of the existing demands.

The first step in the supply-to-demand allocation process of step 215 is to determine whether there is enough supply to satisfy all the demands in the demand list. If the total demand for the item exceeds its total supply, the extra demand is allocated from the bottom end of the second demand list. That is, the lowest priority demand with the latest plan date is not allocated to a supply and the resulting supply-to-demand allocation record has a future date.

The next step in the supply-to-demand allocation process of step 215 is to determine whether there is more supply than is required to satisfy the demand. If the remaining demand is less than the total supply, there is excess supply. If there is excess supply and if the process is allocating excess supply at the earliest date possible, the process will track the quantity of the excess supply. Otherwise, if the process is allocating excess supply at the latest date possible, the supply at the bottom end of the sorted supply list is allocated to the excess supply and the tracked excess supply quantity is then treated as equal to zero. The resulting supply-to-demand allocation records contain the available date of each excess supply that has been allocated.

The sorted list of supplies that have not been allocated is then processed, from the bottom to the top, allocating supplies to demands or to excess supply. When the supply is allocated to the demand, the date of the resulting supply-to-demand allocation record is the available date of the supply being allocated. If the available date of the last supply with unallocated quantity is on or before the plan date of the last demand with unallocated quantity in the by-date list, then the supply is on time or early for that demand. The lesser amount of the unallocated supply quantity and of the unallocated demand quantity is allocated to the demand. If unallocated supply remains, the allocation process continues by comparing the supply available date to the plan date of the previous demand with unallocated quantity in the first demand list. When the supply has been fully allocated, the allocation process selects the previous supply in the supply list and continues comparing the supply available date to the demand plan date.

If the available date of the last supply with unallocated quantity is after the plan date of the last demand with unallocated quantity in the by-date list, then the supply is too late to satisfy any demand on time. The first step is to check whether any previously tracked excess supply remains. If tracked excess supply remains, the lesser amount of the remaining excess supply and the unallocated supply quantity is allocated to excess supply. If there is no excess supply, the last remaining demand in the second demand list will be late. The allocation process then allocates the lesser of the unallocated supply quantity and the unallocated demand quantity for the last remaining demand in the second list. If any unallocated quantity of the supply remains, the allocation process continues to allocate a previous demand in the second demand list. When all the supply has been allocated, the allocation process selects the previous supply in the supply list and continues comparing the supply available date to the plan date of demands in the first demand list.

After allocating the supply to the demand in step 215, the process of FIG. 7 continues with step 220. In step 220, the available date is propagated to the next level of the supply structure and the steps are repeated through decision step 225 until the highest level of the supply structure is reached. The process then proceeds to step 230, where the available date is propagated to the demands for items. In step 230, when the highest level of the supply structure is reached, the promise date for each demand is determined based on the available dates determined for the supplies.

Figure 8:
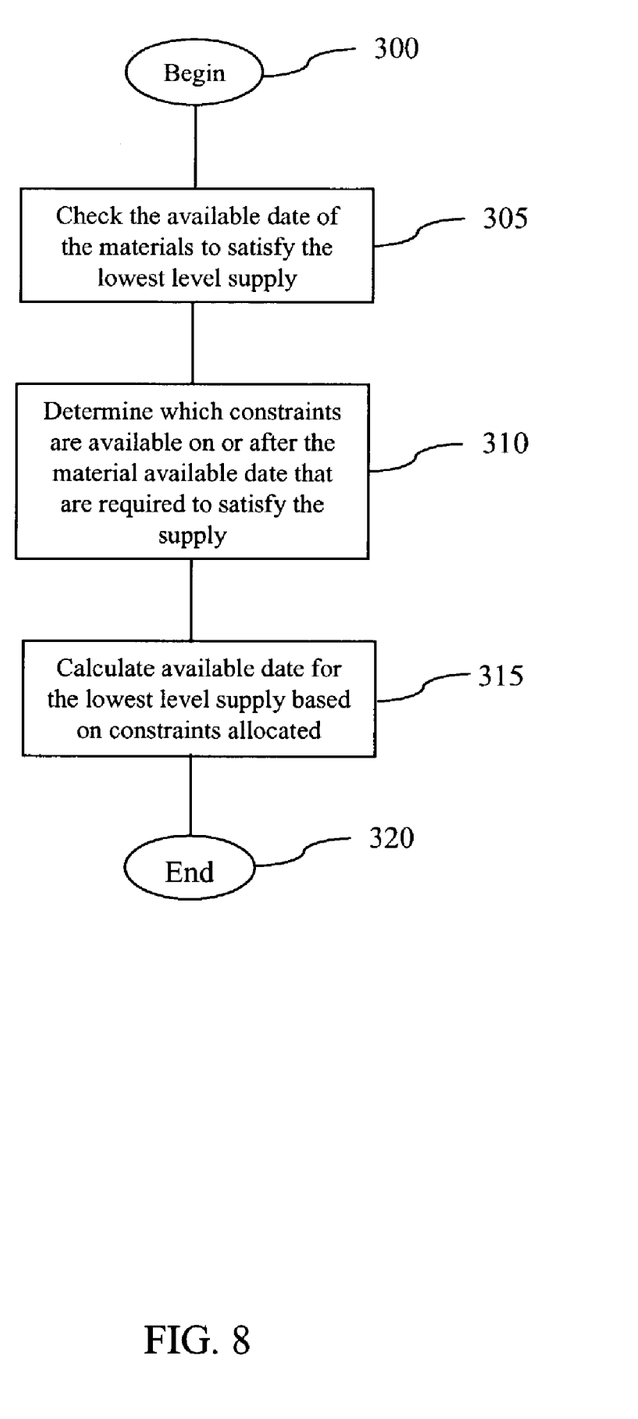
FIG. 8 is a flowchart of a subsidiary process of FIG. 7 for determining the available date of a supply that requires capacity constraint according to the present invention.

FIG. 8 is a flowchart that details a subsidiary process of step 220, in FIG. 7, where available dates are determined for supplies with dependent requirements. The process begins at step 300 and is followed by step 305, where the available date of materials required to fulfill the lowest level supplies are checked. The process then proceeds to step 310 where it determines, for capacity constraints that are required to satisfy the next level supply, availability on or after the material available date. In a next step 315, the process calculates the available dates for the next level supply based on the capacity constraints selected.

To further elaborate on the steps taken in the process of FIG. 8, in step 305, supplies are allocated to the dependent requirements as described in step 215 of FIG. 7. The component availability is then carried up to the supply itself by applying the effective lead time between the component need date and the supply start date. The result is the supply material start date. If no capacity constraint is required for the supply, then the supply available date is calculated from the supply material start date by applying production lead time. If capacity constraint is required, it is first allocated from the cumulative maximum constraint quantity for the required capacity constraints. If there is sufficient maximum constraint, the later of material start and the supply's calculated start date is then used as the first date to seek capacity constraint. If insufficient capacity constraint is simultaneously available for all the capacity constraints applicable to the supply, then the amount of capacity constraint required for the lot size portion of that supply is allocated and capacity constraint is sought in the next capacity constraint period. This process is continued until either all required capacity constraint is allocated or there is no more capacity constraint available for at least one of the needed capacity constraints. Assuming that the capacity constraint requirement can be satisfied, then the date of the last capacity constraint allocated is used to find the available date of the supply.

As discussed with reference to FIG. 3, the system of the present invention may include a fourth sub-processing unit, the full-level pegging engine 50, for executing a process known as full-level pegging. The full-level pegging process is executed at the highest level item. Essentially, the process determines the links between independent demands and the supplies that satisfy them, as defined by the supply-to-demand allocation record(s) created in step 215.

Figure 9:
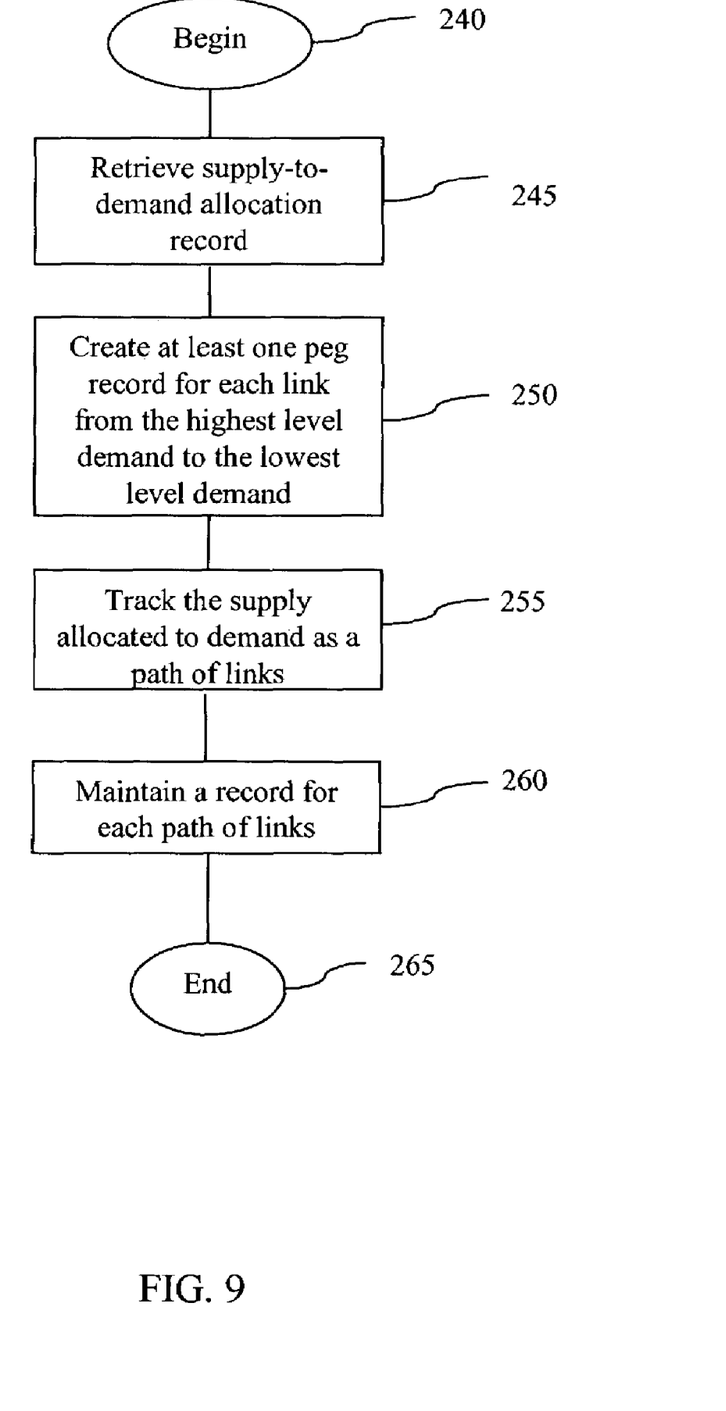
FIG. 9 is a flowchart of a process executed by the full-level pegging engine shown in FIG. 3.

FIG. 9 shows a flowchart that details a process by the full-level pegging engine 50 according to the present invention. Full-level pegging is a process that logically follows the end of the execution engine process in step 235. The process begins at step 240 and is followed by step 245, where the process retrieves the supply-to-demand allocations recorded in step 215 of FIG. 7. The process proceeds to step 250 where at least one peg record is created for each link from the highest level demand to the lowest level demand. In a next step 255, the process tracks the supply allocated to the demand as a path of links. The process then proceeds to step 260 where a record for each path of links is maintained. The process ends at step 265.

On an aside, any excess supply at a particular level is treated as a highest level demand, as if it were independent demand. At each subsequent level, the earliest highest level full-level peg record, for a demand in the supply/demand allocation record, is assigned to the supply. Again, any excess supply is treated as the start of another full-level peg demand. The process is continued until all supplies have been tied to highest level demand or excess supply.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. A computer-readable medium having computer-readable information stored thereon, for determining respective promise dates for two or more demands produced for an item based on a supply structure for fulfilling the demands, and having stored thereon computer-executable instructions which, when executed by a processor, cause the processor to perform the steps of:
   (a) associating an assigned priority value to each of the demands produced for the item;
   (b) for each supply in the supply structure, determining a plan date, based on an existing and planned supply in the supply structure, from a highest level to a lowest level in the supply structure until plan dates have been determined for all supplies in the supply structure for the two or more demands;
   (c) determining available dates for the item based on an availability of each supply in the supply structure, wherein the available dates are determined based on the following steps:
      (c1) sorting a supply list by supply availability;
      (c2) sorting a demand list by plan date;
      (c3) determining when a last available supply on the sorted supply list fulfills a last planned demand on the sorted demand list by its plan date;
      (c4) for the last planned demand fulfilled by its plan date, allocating the last available supply to the last planned demand based on its plan date;
      (c5) for the last planned demand not fulfilled by its plan date, allocating the last available supply to an unfulfilled demand having a lowest assigned priority value;
      (c6) recording the allocation in steps (c4) and (c5) in an allocation record;
      (c7) repeating steps (c3) to (c6) successively for each supply on the sorted supply list until lowest level available dates are determined for the lowest level of the supply structure; and
      (c8) propagating the lowest level available dates to a next level in the supply structure, repeating steps (c1) to (c7) to provide next level available dates;
   wherein steps (c1) through (c8) are executed for each supply in the supply structure successively from the lowest level to the highest level in the supply structure; and
   (d) generating the respective promise dates for the demands based on the available dates determined in step (c), whereby the respective promise dates are committed to the demands produced for the item.

2. The computer-readable medium according to claim 1, further containing computer-readable and computer executable instructions, wherein in step (b) the plan dates are further determined based on the availability of at least one capacity constraint required to fulfill at least one supply.

3. The computer-readable medium according to claim 1, further containing computer-readable and computer executable instructions, wherein in step (d) a given promise date is generated for a given demand by using a sub-priority to maintain at least one promise date previously committed for a previous demand and wherein the at least one promise date previously committed for the previous demand is at least equal in priority value to the priority value assigned to the given demand.

4. The computer-readable medium according to claim 2, further containing computer-readable and computer executable instructions, wherein in step (d) a given promise date is generated for a given demand by using a sub-priority to maintain at least one promise date previously committed for a previous demand and wherein the at least one promise date previously committed for the previous demand is at least equal in priority value to the priority value assigned to the given demand.

5. The computer-readable medium according to claim 1, further containing computer-readable and computer executable instructions for further including the steps of:
   in step (c), determining an excess supply based on a quantity of supply that exists to fulfill the demands; and
   in step (c4), when allocating on-time supplies, setting aside remaining ones of the excess supply thereby allowing earlier supplies to fulfill earlier planned demands as early as possible.

6. The computer-readable medium according to claim 1, further containing computer-readable and computer executable instructions, wherein in step (c), the available dates are further determined based on the availability of at least one capacity constraint required to fulfill at least one supply and wherein the at least one capacity constraint has an availability defined as a rate per period.

7. The computer-readable medium according to claim 2, further containing computer-readable and computer executable instructions, wherein in step (c), the available dates are further determined based on the availability of at least one capacity constraint required to fulfill at least one supply and wherein the at least one capacity constraint has an availability defined as a rate per period.

8. The computer-readable medium according to claim 6, further containing computer-readable and computer executable instructions, wherein the availability of the at least one capacity constraint changes over time.

9. The computer-readable medium according to claim 7, further containing computer-readable and computer executable instructions, wherein the availability of the at least one capacity constraint changes over time.

10. The computer-readable medium according to claim 1, further containing computer-readable and computer executable instructions, wherein in step (c), the available dates are further determined based on the availability of at least one capacity constraint required to fulfill at least one supply and wherein the at least one capacity constraint has a cumulative maximum value.

11. The computer-readable medium according to claim 2, further containing computer-readable and computer executable instructions, wherein in step (c), the available dates are further determined based on the availability of at least one capacity constraint required to fulfill at least one supply and wherein the at least one capacity constraint has a cumulative maximum value.

12. The computer-readable medium according to claim 1, further containing computer-readable and computer executable instructions, wherein at least one supply in the supply structure has a plurality of sources for fulfilling the supply.

13. The computer-readable medium according to claim 2, further containing computer-readable and computer executable instructions, wherein at least one supply in the supply structure has a plurality of sources for fulfilling the supply.

14. The computer-readable medium according to claim 1, further containing computer-readable and computer executable instructions, further including the step of, prior to step (a), queuing the demands according to a sub-priority value assigned to each supply and each demand for the item, wherein the sub-priority value is defined by the sequence in which the each supply and the each demand for the item was committed, whereby in step (d) the promise dates are generated while maintaining at least one promise date previously committed for a previous demand.

15. The computer-readable medium according to claim 2, further containing computer-readable and computer executable instructions, further including the step of, prior to step (a), queuing the demands according to a sub-priority value assigned to each supply and each demand for the item, wherein the sub-priority value is defined by the sequence in which the each supply and the each demand for the item was committed, whereby in step (d) the promise dates are generated while maintaining at least one promise date previously committed for a previous demand.

16. The computer-readable medium according to claim 1, further containing computer-readable and computer executable instructions, wherein, following step (d), further comprising the steps of:
   (d1) retrieving the allocation record of the each supply;
   (d2) providing at least one peg record for each link determined from the highest level demand to a next highest demand;
   (d3) tracking the each supply allocated to the demand, in step (d1), as a path of links, from the highest level to the lowest level in the supply structure; and
   (d4) maintaining a record for the path of links determined in step (d3);
wherein step (d2) is repeated for the highest level to the lowest level of the supply structure.

17. The computer-readable medium according to claim 2, further containing computer-readable and computer executable instructions, wherein, following step (d), further comprising the steps of:
   (d1) retrieving the allocation record of the each supply;
   (d2) providing at least one peg record for each link determined from the highest level demand to a next highest demand;
   (d3) tracking the each supply allocated to the demand, in step (d1), as a path of links, from the highest level to the lowest level in the supply structure; and
   (d4) maintaining a record for the path of links determined in step (d3);
wherein step (d2) is repeated for the highest level to the lowest level of the supply structure.

18. The computer-readable medium according to claim 1, further containing computer-readable and computer executable instructions, wherein in step (c), the available dates are further determined based on the availability of at least one capacity constraint required to fulfill at least one supply.

19. The computer-readable medium according to claim 2, further containing computer-readable and computer executable instructions, wherein in step (c), the available dates are further determined based on the availability of at least one capacity constraint required to fulfill at least one supply.

20. The computer-readable medium according to claim 1, further containing computer-readable and computer executable instructions, wherein in step (d) the promise dates are generated while maintaining at least one promise date previously committed for a previous demand.

21. The computer-readable medium according to claim 2, further containing computer-readable and computer executable instructions, wherein in step (d) the promise dates are generated while maintaining at least one promise date previously committed for a previous demand.

22. The computer-readable medium according to claim 1, further containing computer-readable and computer executable instructions, wherein in step (c5) the last available supply is allocated to a last planned one of a plurality of unfulfilled demands having a same lowest assigned priority value.

23. The computer-readable medium according to claim 1, further containing computer-readable and computer executable instructions, wherein in step (c5) the last available supply is allocated amongst a plurality of unfulfilled demands having a same lowest assigned priority value.

24. The computer-readable medium according to claim 1, further containing computer-readable and computer executable instructions for further including the steps of:
- in step (c), determining an excess supply based on a quantity of supply that exists to fulfill the demands; and
- in step (c5), when allocating late supplies, setting aside remaining ones of the excess supply as available for future demands.

25. The computer-readable medium according to claim 1, further containing computer-readable and computer executable instructions for further including the steps of, in step (c):
- determining an excess supply based on a quantity of supply that exists to fulfill the demands; and
- tracking the excess supplies to fulfill earlier planned demands.

* * * * *

UNITED STATES PATENT AND TRADEMARK OFFICE
CERTIFICATE OF CORRECTION

PATENT NO. : 7,610,212 B2 Page 1 of 1
APPLICATION NO. : 10/438932
DATED : October 27, 2009
INVENTOR(S) : Klett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1578 days.

Signed and Sealed this

Fourteenth Day of December, 2010

David J. Kappos
*Director of the United States Patent and Trademark Office*